United States Patent

[11] 3,632,992

[72] Inventor Edgar Wolf
New Hyde Park, N.Y.
[21] Appl. No. 697,524
[22] Filed Jan. 12, 1968
[45] Patented Jan. 4, 1972
[73] Assignee Digitronics Corporation
Albertson, N.Y.

[54] SERIAL RECORD MEDIUM READER
11 Claims, 5 Drawing Figs.

[52] U.S. Cl. .......... 235/61.11E
[51] Int. Cl. .......... G06k 7/10
[50] Field of Search .......... 235/61.115; 340/174.1; 178/7.6

[56] References Cited
UNITED STATES PATENTS

| | | | |
|---|---|---|---|
| 1,981,942 | 11/1934 | Becker | 178/69.5 |
| 2,008,272 | 7/1935 | Briggs | 178/69.5 |
| 2,172,290 | 9/1939 | Nichols | 178/69.5 |
| 2,229,456 | 1/1941 | Hurd | 178/6 |
| 2,244,647 | 6/1941 | Broido | 209/111 |
| 3,293,415 | 12/1966 | Fiehl | 235/61.11 |

*Primary Examiner*—Maynard R. Wilbur
*Assistant Examiner*—William W. Cochran
*Attorney*—Yuter & Fields

ABSTRACT: Apparatus for serially reading a row of information bits parallelly recorded on a record medium including a record support and a source of light disposed on one side of the record medium. Scanning is provided in the form of a surface having a plurality of apertures adapted to be sequentially aligned with the information bits in each row of the record medium. A sensor is disposed on the other side of the record medium for sensing the passage of light through the information bits and the scanning means to produce a signal.

INVENTOR.
Edgar Wolf
BY
Yuter + Spiecens
ATTORNEYS

SERIAL RECORD MEDIUM READER

This invention relates generally to an apparatus for reading information and, more particularly, pertains to reading equipment for effecting the serial reading of rows of information bits on a record medium.

In the computing machine field, there are employed information storage or record media such as paper tapes, having rows of data juxtaposed across their length. Conventionally, each row on a paper tape comprises a plurality of transversely spaced index positions, commonly referred to as channels, which may be perforated according to predetermined combinational codes to represent various numeric characters or data and the like. Such tapes are normally fed to a reader wherein the channels in successive rows are sensed simultaneously for the presence or absence of perforations or information bits; such sensing or reading being termed "parallel by bit."

In many applications it is desirable to utilize the information contained on the tape in serial order. One manner of obtaining the information in that order is to store the information in a register for serial readout. However, this is an expensive method in terms of both economy of cost and space.

Accordingly, an object of this invention is to provide a relatively simple and inexpensive apparatus for rapidly reading or sensing in serial order the data contained in the rows of a record medium.

Another object of the present invention is to provide an apparatus for serially reading the channels comprising the different rows of data of a record medium.

A further object and feature of the present invention resides in the novel details of construction which provide a serial reader of the type described which can be operated at a rapid rate and is accurate and reliable in operation.

Another object of the present invention is to provide apparatus for serially reading information bits of a row of information which is relatively inexpensive to manufacture.

Accordingly, the apparatus of the present invention includes means for supporting a record medium having a row of data comprising information bits recorded thereon. A source of light is disposed on one side of the medium for illuminating said one side. Scanning means is provided for scanning the row of information in a succession of scans sequentially disposed along the row of information. Optical means is disposed on the other side of the record medium for sensing the passage of light through the record medium and the scanning means to produce signals representing the recorded information.

Other objects and features of the present invention will become more apparent from a consideration of the following detailed description when taken in conjunction with the accompanying drawings, in which.

Figure 1:
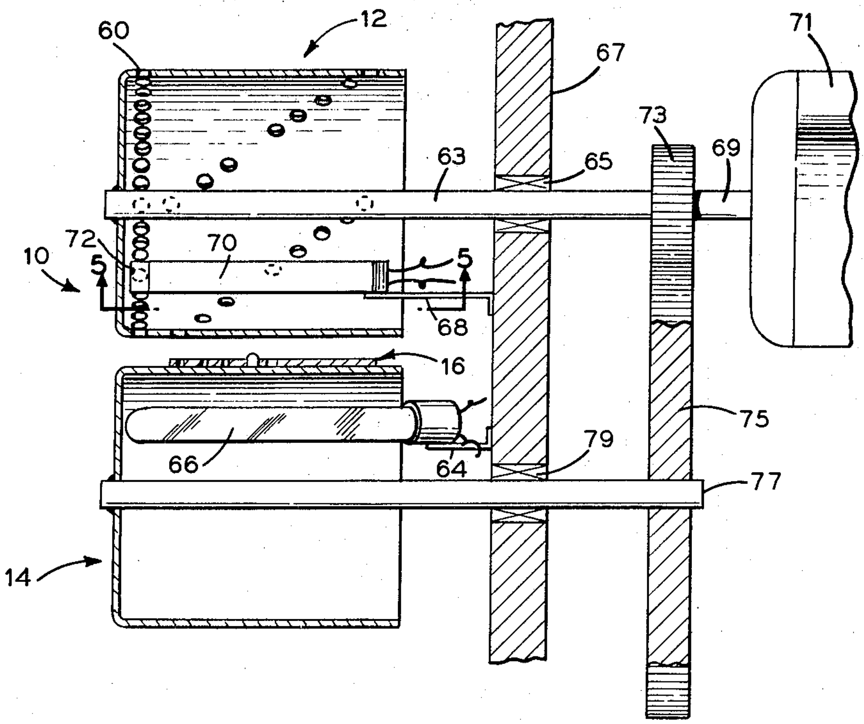
FIG. 1 is a vertical sectional view of an apparatus constructed according to the present invention.

The apparatus of the present invention will be described in conjunction with a paper tape having rows of perforations which represent data according to a predetermined combinational code. However, it is to be understood that this is by way of example only and is not to be interpreted as being a limitation of the present invention. That is, the apparatus of the present invention may be utilized to serially read out any parallelly recorded information in the form of perforations on a record medium, such as punch cards and the like.

The apparatus of the present invention is designated generally by the reference numeral 10 in the FIGS. and includes an upper scanning cylinder or drum 12 and a lower transport cylinder or drum 14. The transport drum 14 is adapted to advance a paper tape 16 having juxtaposed rows of transversely spaced channels which are selectively perforated to represent information bits. As noted in greater detail below, the transport drum 14 engages the paper tape 16 and advances each row of data to a reading station so that the information contained in the row at the reading station may be serially read out by the apparatus of the present invention.

Figure 2:
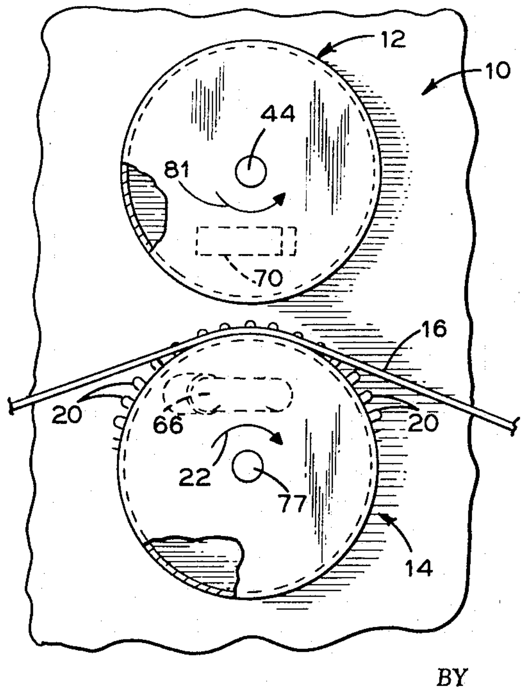
FIG. 2 is a front elevational view thereof with parts broken away.
Figure 3:
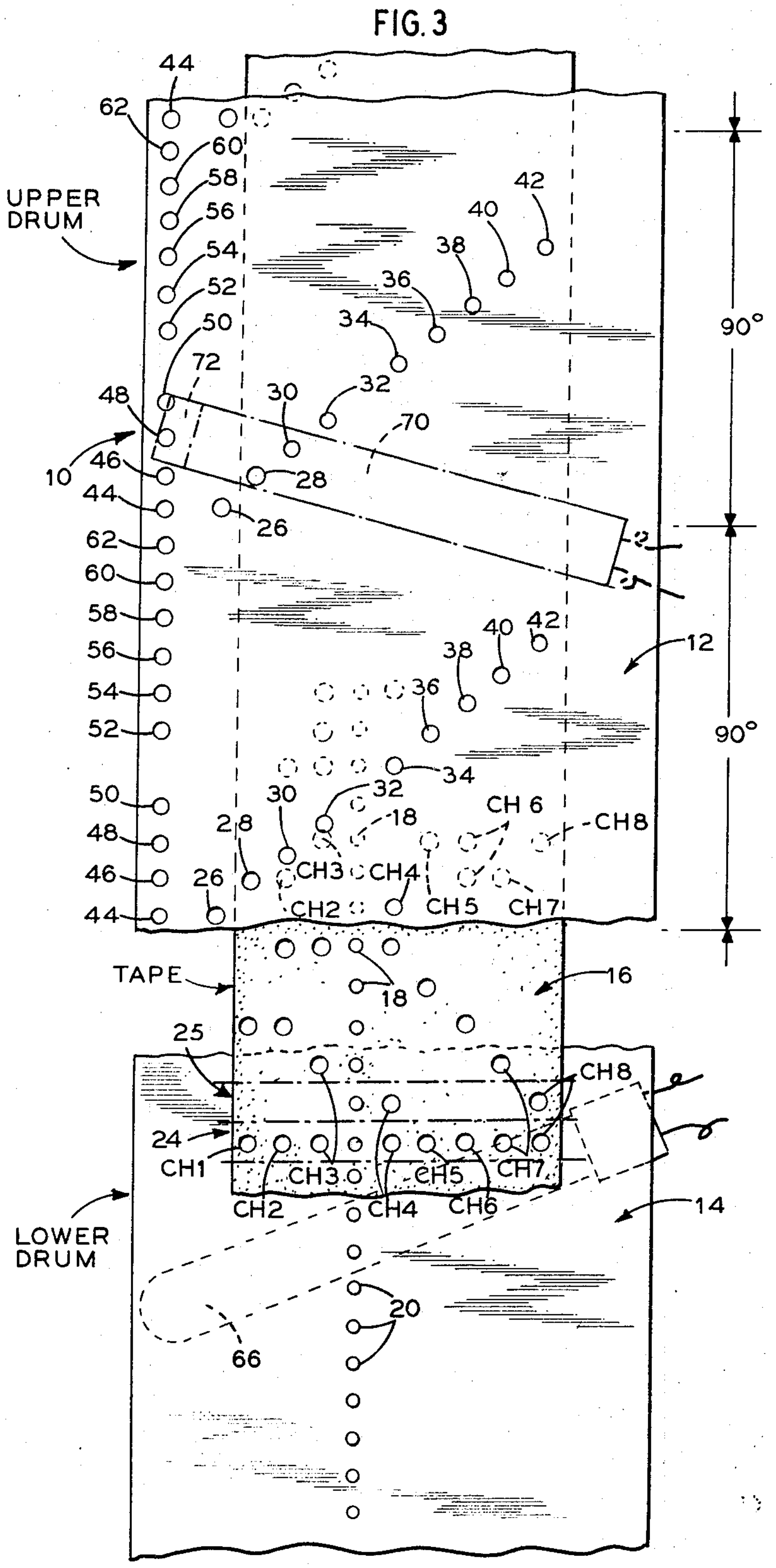
FIG. 3 is a partial developmental view of the drums shown in FIGS. 1 and 2.

It is believed that the apparatus of the present invention may best be understood by reference to FIG. 3, which illustrates a development of a portion of the scanning drum 12 and the transport drum 14 and a portion of a record medium in the form of a paper tape 16. The paper tape 16 is conventional in construction and is provided with longitudinally spaced sprocket holes 18 which are adapted to be engaged by circumferentially spaced upstanding sprocket teeth 20 on the drum 14 to advance the paper tape past a reading station. Thus, as the drum 14 rotates in the direction indicated by the arrowhead 22 in FIG. 2, the sprocket teeth 20 successively engage the sprocket holes 18 in the tape 16 and advance the tape from the left to the right, as taken in FIG. 2.

The tape 16 contains 8 index or recording positions which are referred to hereinafter as channels, which are perforated in various combinations to represent letters, numbers, special symbols or control signals. For example, the row of data designated by the reference numeral 24 in FIG. 3 contains a respective perforation CH1–CH8 at each index position in this row to represent a character in the particular code being utilized. On the other hand the row designated generally by the reference numeral 25 contains perforations in a different combination to represent a different character. More particularly, the row 25 is perforated at the index positions or channels 4 and 8 and the perforations are designated respectively CH4 and CH8. The remainder of the rows of data on the tape 16 are similarly perforated to represent various characters in accordance with the code being utilized.

The scanning drum 12 is provided with an array of nine apertures 26–42. That is, the apertures 26–42 extend axially across the width of the drum 12 and are circumferentially spaced from each other on the drum surface. (In the development of FIG. 3 each aperture is displaced lengthwise from an adjacent aperture in the manner indicated below.) Additionally each one of the apertures 28–42 is positioned to overlie or be aligned with a respective index position or channel on the paper tape 16.

To be more specific, the aperture 28 is in alignment with the CH1 position on the tape 16. The aperture 30 is in alignment with the CH2 position on the paper tape 16. In a similar manner, the apertures 30, 32, 34, 36, 38, 40 and 42 are aligned with the respective channels CH3, CH4, CH5, CH6, CH7 and CH8. The width or the axial length of the drum 12 is substantially in excess of the width of the paper tape 16. Moreover, the aperture 26 is positioned to extend beyond the edge of the paper tape 16 for reasons which will become apparent from a consideration of the operation of the present apparatus, as described below.

The drum 12 is further provided with a respective opening adjacent the peripheral edge thereof for each one of the apertures 26–42. In other words, each one of the circumferentially spaced openings is associated with a respective one of the apertures 26–42. For example, the opening 44 is associated with the aperture 26, the opening 60 is associated with the aperture 42 whereas the intermediate openings 46–58 are respectively associated with the intermediate apertures 28–40. Additionally, the drum 12 is provided with an opening 62 for which there is no corresponding aperture in the drum array.

In practice, the pattern of apertures 26–42 and openings 44–62 are repeated four times on the surface of the drum 12. That is, each pattern of openings and apertures extends over a quadrant of the drum. However, it is to be noted that this is by way of illustration only since the pattern may be repeated a greater or lesser number of integer multiples.

As shown in FIG. 1, the scanning drum 12 is fixedly mounted on an axially extending shaft 63 which is rotatable in a bearing 65 received in an appropriate mounting means 67 such as a wall or a bracket. The shaft 63 is connected to the output shaft 69 of a synchronous motor 71. Rotatable with the shaft 63 is a gear 73 which is in meshing engagement with a gear 75. The gear 75 is fixedly received on a shaft 77 which is rotatable in a bearing 79 in the wall 67. The shaft 77 axially extends through the drum 14 and fixedly receives the drum thereon. Accordingly, the motor 71 rotates the scanning drum 12 in the direction indicated by the arrowhead 81 in FIG. 2, and, through the gearing arrangement comprising gears 73 and 75, similarly rotates the transport drum 14 in the direction indicated by the arrowhead 22.

As noted above, in practice the scanning drum 12 is provided with 4 repeat patterns of openings and helically disposed apertures. For ease of reference, the position of a row of data or information bits directly below the scanning drum 12 will be referred to as the reading station. Accordingly, the gear ratio between the gears 73, 75 is chosen so that the scanning drum 12 will rotate through a quarter of a revolution (one pattern of openings and apertures) during the interval of time that it takes for the next row of information bits to be advanced to the reading station. For example, it is assumed that the angular velocity of the scanning drum 12 is 60 $\pi$ radians per second or 30 revolutions per second. If the patterns are repeated at 90° intervals around the surface of the scanning cylinder, the scanning cylinder or drum 12 will be able to scan 30×4 or 120 rows of information bits every second. If the transport drum 14 is provided with 32 circumferentially spaced sprocket teeth (it being understood that there is one sprocket hole for every row of data on the tape 16), then the angular velocity of the transport drum should be 120/32 revolutions each second. Thus, the slowdown gear ratio of the scanning drum 12 to the transport drum 14 should be $$30/\frac{120}{32}$$

or 8 to 1. However, it is obvious that a different ratio will be utilized if any of the factors involved in the above illustrative calculation, such as the number of repeat patterns on the drum, are changed.

Mounted on the wall 67 is a bracket 64 which supports an elongated lamp 66 disposed within the transport cylinder or drum 14. The transport drum 14 is fabricated from a transparent material so that the light from the lamp 66 illuminates the underside of the paper tape 16 or, of course, the transport drum may be suitably perforated if made from opaque material. Moreover, as shown in FIG. 3, the lamp 66 extends sufficiently beyond the outer edge of the paper tape 16 so the light rays from the lamp 66 illuminate the circumferentially spaced openings 44–62 on the scanning drum 12.

Figure 5:
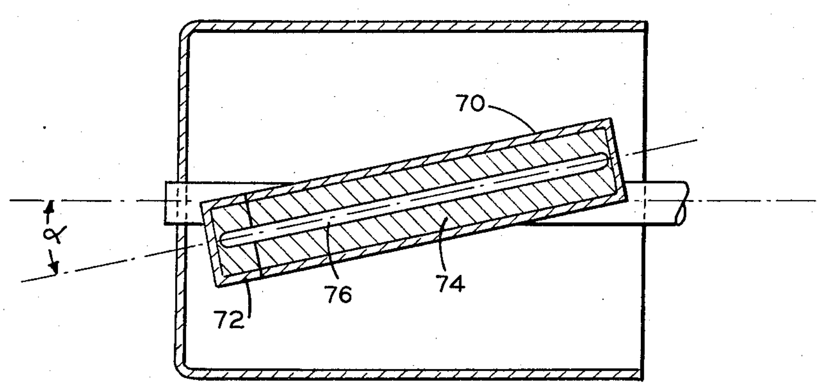
FIG. 5 is a sectional view taken along the line 5—5 of FIG. 1.

Similarly mounted on the wall 67 by a bracket 68 and disposed within the scanning cylinder or drum 12 is a light responsive device or photoelectric cell 70. The photoelectric cell 70 is of sufficient axial length so that it extends from the aperture 26 to the aperture 42 in the array of apertures on the drum 12. Although a single elongated photoelectric cell is shown, it is to be understood that individual photoelectric cells for each one of the apertures 26–42 may be utilized instead of the cell 70. Mounted on the outer end of the cell 70 is another photoelectric cell 72 which is in vertical alignment with the circumferentially spaced openings 44–62 on the drum 12. As shown in FIG. 5, a mask 74 covers the bottom surface of the photoelectric cells 70 and 72 and is provided with a slit 76 so that light from the lamp 66 which passes through the slit 76 is detected by the photoelectric cells 70 and 72.

In order to compensate for the fact that the row of data being scanned is continuously advancing during the time that the scanning drum 12 is rotating through one pattern of openings and apertures, the photocells 70, 72, the slit 76 in the mask 74, and the lamp 66 are skewed at an angle $\alpha$ with respect to the axis of the drum 12. The angle $\alpha$ is determined by the distance that a row of data will advance during the interval of time that it requires the drum 12 to rotate through an arc equal to the circumferential spacing between apertures 28 and 42 and the distance between channels 1 and 8. In other words, the tangent $\alpha$ is equal to the distance the tape advances during a scanning or reading cycle divided by the transverse distance between channels 1 and 8 on the tape.

In view of the fact that the tape 16 is advancing and the photocells 70, 72 and the lamp 66 are skewed at the angle $\alpha$, the circumferential spacing between adjacent apertures decreases for ascending channel position apertures. To be more specific, the circumferential spacing between apertures 40 and 42 is less than the circumferential spacing between the apertures 28 and 30. In other words the apertures 28–42 are positioned on the drum 12 so that the proper aperture will be aligned with the slit 76 in the mask 74 when the corresponding index position on the tape 16 is to be scanned.

In operation, the drum 12 is adapted to perform a succession of scans sequentially disposed along the row of information bits of the paper tape 16 and the photoelectric cell 70 is adapted to produce appropriate signals when a perforation is detected in the particular row being scanned. More specifically, initially it is assumed that the row of data 24 is positioned at the reading station in the illustrative embodiment of the present invention and that the aperture 28 in the drum 12 overlies the CH1 perforation in the tape 16. Thus, light will pass through the perforation CH1 in channel 1 and the aperture 28 in the array of apertures and be sensed by the photoelectric cell 70. Accordingly, the photoelectric cell 70 will produce an appropriate signal or pulse.

As the drum 12 rotates, the aperture 28 will move beyond the CH1 perforation in channel 1 of the row 24 thereby cutting off the light to the photoelectric cell 70. However, as the aperture 28 moves out of alignment with the CH1 perforation, the aperture 30 moves into alignment with the CH2 perforation in channel 2 of the row 24. The photoelectric cell 70 senses the light passing through the CH2 perforation and the aperture 30 in the drum 12 and accordingly maintains the output signal of the cell at the preselected level. This scanning procedure continues for perforations CH3–CH8 at the respective channel positions 3 through 8 by the respective apertures 32–42. Hence, each one of the perforations in the row 24 is sequentially sensed by the respective apertures 28–42 in the scanning drum 12.

When the row of apertures 25 has advanced to the reading station the scanning drum 12 will have rotated through a quarter of a revolution thereby bringing the next pattern of apertures on the drum 12 into a reading or scanning position. However, it is to be noted that there is no perforation in the channel 1 position of the row 25 on the paper tape 16. Thus, even though the aperture 28 in the next pattern of apertures is aligned with the channel 1 position of the row 25, no light will be detected by the photoelectric cell 70 since the paper tape 16 will prevent the passage of light through this index position. In fact, no light will be detected by the photoelectric cell 70 until the aperture 34 in the drum 12 is aligned with the channel 4 index position in the row 25 of information bits.

Figure 4:
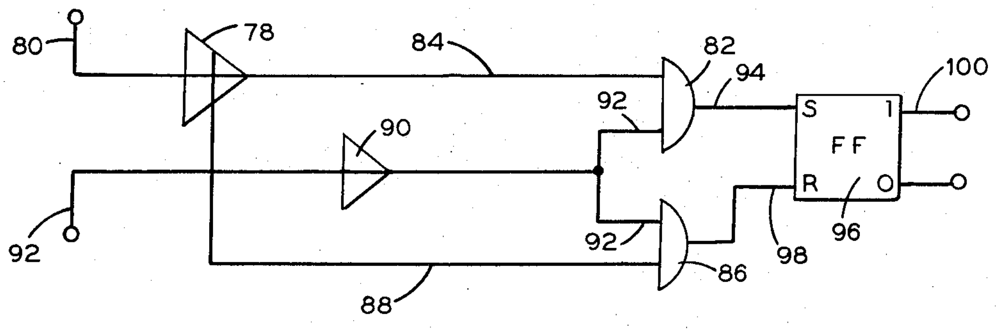
FIG. 4 is a schematic logic diagram, in block form, of the transmitter circuit of the present invention.

A transmitter circuit constructed according to the present invention is shown in FIG. 4 and includes an amplifier 78, the input terminal of which is connected to the photoelectric cell 70 by a lead 80. The noninverted output terminal of the amplifier 78 is connected to an AND-gate 82 by a lead 84. The inverted output terminal of the amplifier 78 is connected to an input terminal of another AND-gate 86 by a lead 88. Conventionally, the amplifier 78 produces an output signal at its normal output terminal if a pulse is applied to its input terminal and it produces an output signal at its inverted output terminal if no pulse is applied to its input terminal. The photoelectric cell 72 is connected to respective input terminals of the AND-gates 82 and 86, through a noninverting amplifier 90, by a lead 92. The output of the AND-gate 82 is connected to the set terminal of a bistable multivibrator or flip-flop 96 by a lead 94. The output terminal of the AND-gate 86 is connected to the reset terminal of the flip-flop 96 by a lead 98. The set or logical "1" output terminal of the flip-flop 96 is connected to an appropriate device which interprets the signal information produced at the output terminal by a lead 100.

The reader of the present invention is adapted to produce a start pulse at the beginning of a reading or scanning sequence and a stop pulse at the termination of a reading sequence. Additionally, the transmitter circuit is adapted to produce an output signal having a first level when a perforation is sensed in a particular channel position during a reading sequence and to produce a signal having another output level when no perforation is sensed in a channel position.

More particularly, it is to be noted that the first aperture 26 in the array of apertures and the corresponding associated opening 44 in the circumferentially spaced openings are positioned beyond the edge of the tape. Hence, when the opening 44 and the aperture 26 are aligned with the slit 76 in the mask 74, light strikes both of the photoelectric cells 70 and 72 which produce output signals on the leads 80 and 92, respectively. Accordingly, pulses appear at the respective inputs to the AND-gate 82 thereby setting the flip-flop 96 to produce an output signal on the lead 100. As the drum 12 rotates, the aperture 28 is aligned with the CH1 perforation in the channel 1 position of the row of information bits 24, for example, in the manner noted hereinabove. Accordingly, the light passing through the perforation CH1 and the aperture 28 is sensed by the photoelectric cell 70 to produce an output signal on the lead 80. Additionally, the opening 46 is positioned so that light passing through the opening 46 which is associated with the aperture 28 is sensed by the photoelectric cell 72 thereby producing an output signal on the lead 92. Thus, the AND-gate 82 again produces a pulse at its output terminal. However, since the flip-flop 96 had been set by the correspondence of pulses produced in response to light passing through the opening 44 and the aperture 26, the level of the signal appearing on the lead 100 remains the same. It will now be obvious that the remaining perforations in the row 24 will be sequentially scanned in a similar manner. That is, the openings 44–60 and the aperture 26–42 are positioned so that the signals produced by the photocells 70, 72 coincide in time when light passes through any one of the openings 44–60 and the associated one of the apertures 26–42.

On the other hand, if it is assumed that the row of information bits 25 is being scanned, a start pulse again is produced when light passes through the opening 44 and the aperture 26 and is sensed by the respective photoelectric cells 72 and 70. However, when the aperture 28 is aligned with the channel 1 index position in the row 25, no light is sensed by the photoelectric cell 70. Light passing through the associated opening 46 is sensed by the photoelectric cell 72 and a pulse appears on the lead 92. Since no signal appears on the lead 80, the inverting amplifier 78 produces a pulse on the lead 88. Accordingly, both inputs to the AND-gate 86 will be energized to cause a pulse to appear on the lead 98. Thus, the reset input terminal of the flip-flop 96 will be energized to reset the flip-flop and change the level of the signal appearing on the lead 100. Hence, no signal appears on the lead 100 until the leads 80 and 92 are energized simultaneously. It will now be obvious that the openings 44–62 essentially cause the photocell 72 to produce clock pulses.

That is, the output level of the signal appearing on the lead 100 will remain substantially at zero level until the aperture 34 in the drum array is aligned with the perforation CH4 in the channel 4 index position in the row 25, whereupon light will pass through this perforation and the corresponding aperture to produce an output signal at the photoelectric cell 70. The photoelectric cell 72 senses the light passing through the associated opening 52 and similarly produces a pulse on the lead 92 to produce an output signal at the AND-gate 82 thereby setting the flip-flop 96.

At the termination of a scanning or reading cycle, light passes through the opening 62 and is sensed by the photoelectric cell 72. However, since there is no corresponding aperture in the drum array of apertures, no corresponding pulse will be applied to the lead 80. Accordingly, the flip-flop 96 will be reset, in the manner indicated hereinabove, to remove the signal on the lead 100 if any is present. This designates the end of the scanning sequence for that particular row of information bits. When the next row of information bits has advanced to the reading station and is about to be scanned by the drum 12, a start pulse will be produced in the manner indicated hereinabove to indicate that the next row of information bits is about to be scanned.

Accordingly, a simple apparatus has been described for serially reading information parallelly recorded on a medium which is simple in construction and economic to fabricate.

While a preferred embodiment of the present invention has been shown and described herein, it will become obvious that numerous omissions, changes and additions may be made in such embodiment without departing from the spirit and scope of the present invention. For example, any surface having the proper relationship between the openings and apertures may be utilized instead of the drum 12.

What is claimed is:

1. Apparatus for serially reading a row of information recorded on a record medium comprising: means for supporting the record medium, a source of light disposed on one side of the record medium for illuminating said one side of the record medium, scanning means for scanning the row of information in a succession of scans sequentially disposed along the row of information, and optical means disposed on the other side of the record medium for sensing the passage of light through the record medium and said scanning means to produce a first control signal, said record medium comprising a transversely arrayed set of index positions which are perforated according to a preselected code, and said scanning means includes a surface having a plurality of apertures disposed along the width of said surface, each one of said plurality of apertures being displaced lengthwise from an adjacent aperture, the transverse spacing between adjacent ones of said plurality of apertures corresponding to the transverse spacing between the adjacent index positions, moving means for providing relative movement between said surface and the record medium to sequentially align different ones of said plurality of apertures with respective ones of the index positions in the set of index positions, and a row of openings in said surface in at least one-to-one correspondence with said apertures beyond the edge of the record medium, each one of said openings being associated with a different one of said plurality of apertures and being positioned whereby light passes through each one of said openings concomitantly with the alignment of the associated aperture with its respective index position, and clock means responsive to the passage of light through each one of said openings to produce respective clock pulses.

2. Apparatus as in claim 1, and bistable means responsive to the simultaneous reception of a clock pulse and a first control signal to produce a signal having a first level and being responsive to a clock pulse only to produce a signal having a second level.

3. Apparatus as in claim 1, and mounting means for mounting said surface between the record medium and said optical means.

4. Apparatus as in claim 1, and means for generating start and end sequence signals.

5. Apparatus as in claim 1, in which said light source and said optical means are skewed with respect to a transverse line.

6. In a system for serially reading a storage medium having a plurality of rows of *n* transversely spaced information bits recorded in parallel thereon, a reading station, moving means for supporting and moving the storage medium to continuously advance the plurality of rows of information bits past said reading station, a source of light disposed on one side of the storage medium for illuminating the storage medium, scanning means including a hollow drum having at least *n* apertures on its surface, said *n* apertures being disposed in a preselected array so that different ones of said $n$ apertures are sequentially aligned with respective bits of information in the row of information bits at said reading station, rotating means synchronized with said moving means for rotating said drum relative to said storage medium to scan the row of information bits moving past said reading station, sensing means disposed on the other side of the storage medium responsive to the passage of light through said record medium and said $n$ apertures to produce an information signal and clock means for producing clock pulses, said clock means including at least $n$ circumferentially spaced openings in said drum beyond the edge of the storage medium, each one of said openings being associated with a respective one of said openings concomitantly with the alignment of the associated aperture with its respective information bit position, said light source being sized and positioned to sequentially illuminate said openings as said drum rotates, and pulse means responsive to the passage of light through said openings to produce clock pulses.

7. A system as in claim 6, in which said rotating means includes a motor, and gearing means connecting said moving means and said drum with said motor for rotating said drum at a faster rate than said moving means to permit said drum to scan the row of information bits at said reading station.

8. A system as in claim 6, and circuit means responsive to the coincidence of a clock pulse and said information signal for producing a signal having a first level and responsive to a clock pulse only for producing a signal having a second level.

9. A system as in claim 6, in which said array of apertures includes $n+1$ apertures, a preselected one of said apertures being positioned on said drum to extend beyond the edge of the storage medium, a start pulse opening on said drum associated with said preselected aperture, and circuit means responsive to the concurrence of a clock pulse from said pulse means produced by light passing through said start pulse opening and an information signal from said sensing means produced by light passing through said preselected aperture for generating a start signal.

10. A system as in claim 9, and a stop opening in said drum positioned to extend beyond the edge of the storage medium, said circuit means being responsive to a clock pulse from said pulse means produced by light passing through said stop opening to generate a stop signal.

11. A system as in claim 6, in which each of said apertures is displaced lengthwise from an adjacent aperture, the transverse distance between adjacent ones of said apertures corresponding to the transverse spacing between information bits, the lengthwise spacing between adjacent apertures decreasing for the apertures associated with increasing information bit positions in each row.

* * * * *